(12) United States Patent
Ma et al.

(10) Patent No.: US 10,331,521 B2
(45) Date of Patent: Jun. 25, 2019

(54) METHOD AND APPARATUS FOR MONITORING ROBOT OPERATING SYSTEM

(71) Applicant: BEIJING BAIDU NETCOM SCIENCE AND TECHNOLOGY CO., LTD., Haidian District Beijing (CN)

(72) Inventors: Yu Ma, Haidian District Beijing (CN); Weide Zhang, Haidian District Beijing (CN); Wei He, Haidian District Beijing (CN); Haifeng Wang, Haidian District Beijing (CN); Zhuo Chen, Haidian District Beijing (CN); Yibing Liang, Haidian District Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 283 days.

(21) Appl. No.: 15/410,454

(22) Filed: Jan. 19, 2017

(65) Prior Publication Data
US 2018/0074878 A1 Mar. 15, 2018

(30) Foreign Application Priority Data
Sep. 14, 2016 (CN) .......................... 2016 1 0827061

(51) Int. Cl.
*G06F 11/07* (2006.01)
*G06F 11/14* (2006.01)

(52) U.S. Cl.
CPC ........ *G06F 11/1438* (2013.01); *G06F 11/076* (2013.01); *G06F 11/0736* (2013.01); *G06F 11/0739* (2013.01)

(58) Field of Classification Search
CPC ............... G06F 11/0754; G06F 11/076; G06F 11/0793; G06F 11/1438; G06F 11/3017;
(Continued)

(56) References Cited

U.S. PATENT DOCUMENTS 5,715,386 A * 2/1998 Fulton, III .......... G06F 11/1438
714/15
6,026,499 A * 2/2000 Shirakihara ......... G06F 11/1407
709/224
(Continued)

OTHER PUBLICATIONS

"Robot Operating System" 2016 Wikipedia (Year: 2016).*

*Primary Examiner* — Gabriel Chu
(74) *Attorney, Agent, or Firm* — Seed IP Law Group LLP (57) ABSTRACT

This disclosure discloses a method and apparatus for monitoring a robot operating system. The method in an embodiment includes: obtaining process identities of to-be-monitored nodes in a group of to-be-monitored nodes; inquiring about state information of processes corresponding to the process identities; determining whether the to-be-monitored nodes are operating normally, based on the state information of the processes; and outputting information that the group of to-be-monitored nodes is abnormal, in response to a number of normally operating to-be-monitored nodes in the group of to-be-monitored nodes being below a predetermined threshold. In this embodiment, the nodes are monitored in groups to improve the efficiency of maintaining the robot operating system.

12 Claims, 5 Drawing Sheets

(58) Field of Classification Search
CPC ........ G06F 11/302; G05B 2219/40164; G05B 2219/33309; G05B 2219/40204
See application file for complete search history.

(56) References Cited

U.S. PATENT DOCUMENTS

| | | | | |
|---|---|---|---|---|
| 6,594,774 | B1* | 7/2003 | Chapman | G06F 11/366 714/2 |
| 6,718,486 | B1* | 4/2004 | Roselli | G06F 11/1438 714/41 |
| 6,745,350 | B1* | 6/2004 | Cline | G06F 11/0715 714/38.14 |
| 6,763,369 | B1* | 7/2004 | Ytuarte | H04Q 3/0091 379/269 |
| 7,017,082 | B1* | 3/2006 | Yip | G06F 11/0715 714/38.1 |
| 7,225,362 | B2* | 5/2007 | Deily | G06F 17/30893 707/E17.117 |
| 9,178,772 | B2* | 11/2015 | Dasgupta | H04L 41/145 |
| 2002/0116151 | A1* | 8/2002 | Brown | G06F 9/4843 702/186 |
| 2003/0037172 | A1* | 2/2003 | Lacombe | G06F 11/0757 719/310 |
| 2004/0139373 | A1* | 7/2004 | Brown | G06F 11/3612 714/47.1 |
| 2004/0153823 | A1* | 8/2004 | Ansari | G06F 11/0715 714/38.14 |
| 2005/0246582 | A1* | 11/2005 | Nash | G06F 11/0793 714/12 |
| 2006/0288199 | A1* | 12/2006 | Ertel | G06F 11/366 713/1 |
| 2007/0220375 | A1* | 9/2007 | Baz | G06F 11/0715 714/55 |
| 2010/0152894 | A1* | 6/2010 | Ha | B25J 9/08 700/245 |
| 2011/0041009 | A1* | 2/2011 | Hom | G06F 11/0715 714/23 |
| 2012/0254652 | A1* | 10/2012 | Katiyar | H04L 41/0695 714/4.1 |
| 2013/0090760 | A1* | 4/2013 | Jung | B25J 9/1674 700/245 |
| 2015/0033072 | A1* | 1/2015 | Barr | G06F 11/1438 714/15 |
| 2016/0350173 | A1* | 12/2016 | Ahad | G06F 11/3495 |
| 2016/0359704 | A1* | 12/2016 | Gandham | H04L 63/1425 |
| 2016/0378587 | A1* | 12/2016 | Zhang | G06F 11/0757 714/55 |
| 2017/0116084 | A1 | 4/2017 | Liu | |

* cited by examiner

METHOD AND APPARATUS FOR MONITORING ROBOT OPERATING SYSTEM

CROSS-REFERENCE TO RELATED APPLICATION

This application is related to and claims priority from Chinese Application No. 201610827061.4, filed on Sep. 14, 2016, the entire disclosure of which is hereby incorporated by reference.

TECHNICAL FIELD

This disclosure generally relates to the field of computer technology, and particularly to a method and apparatus for monitoring a robot operating system.

BACKGROUND

A Robot Operating System (ROS) is a standard open source code operating system, it provides a series of software frameworks and utilities to assist a software developer in creating application software, and to provide hardware abstraction, control on underlying devices, implementation of common functions, inter-process message communication, management on data packets, and other functions. The ROS is a distributed processing framework in which the developer can individually design an executable file. Different processes can receive and publish various information (e.g., sensing, control, states, plans). There are applications running in the robot operating system, each of which can be regarded as a node.

However, the ROS itself has not provided a complete system-level real-time monitoring solution. As the ROS is applied to the field of automatic driving, and other systemic complex fields requiring high reliability, the monitoring solution currently provided by the ROS has failed to satisfy the demand, for example, the ROS can only monitor the live condition of a single node, but cannot accommodate a situation where a plurality of nodes are to be monitored in combination.

SUMMARY

An objective of this disclosure is to provide an improved method and apparatus for monitoring a robot operating system so as to address the technical problem mentioned in the BACKGROUND.

In a first aspect, the disclosure provides an improved method for monitoring a robot operating system, the method including: obtaining process identities of to-be-monitored nodes in a group of to-be-monitored nodes; inquiring about state information of processes corresponding to the process identities; determining whether the to-be-monitored nodes are operating normally, based on the state information of the processes; and outputting information that the group of to-be-monitored nodes is abnormal, in response to a number of normally operating to-be-monitored nodes in the group of to-be-monitored nodes being below a predetermined threshold, wherein the predetermined threshold is acquired through an inquiry of preset monitoring configuration information.

In some embodiments, the monitoring configuration information further comprises names of executable files corresponding to the to-be-monitored nodes and names of function packs comprising the executable files; and before the obtaining process identities of to-be-monitored nodes in a group of to-be-monitored nodes, the method further comprises: determining executable files to be executed, according to the names of the executable files, and the names of the function packs comprising the executable files; executing the executable files to be executed to start the to-be-monitored nodes; and recording the process identities of the to-be-monitored nodes.

In some embodiments, the determining whether the to-be-monitored nodes are operating normally, based on the state information of the processes comprises: determining whether the to-be-monitored nodes are in an operating state, based on the state information of the processes; obtaining time points of transmitting data by the to-be-monitored nodes, in response to determining the to-be-monitored nodes being in the operating state, based on the state information of the processes; counting numbers of times of transmitting data by the to-be-monitored nodes in a predetermined period, according to the time points of transmitting data by the to-be-monitored nodes; and determining that the to-be-monitored nodes are operating normally, in response to the counted numbers of times being in a preset range.

In some embodiments, the monitoring configuration information further comprises names of to-be-monitored parameters and a range of values of the to-be-monitored parameters corresponding to the names of the to-be-monitored parameters, the to-be-monitored parameters are generated by the to-be-monitored nodes in operation; and the determining whether the to-be-monitored nodes are operating normally, based on the state information of the processes comprises: determining whether the to-be-monitored nodes are in an operating state, based on the state information of the processes; obtaining the to-be-monitored parameters corresponding to the names of the to-be-monitored parameters, in response to determining the to-be-monitored nodes being in the operating state, based on the state information of the processes; and determining that the to-be-monitored nodes are operating normally, in response to the obtained to-be-monitored parameters being in the range of values of the to-be-monitored parameters.

In some embodiments, the outputting information that the group of to-be-monitored nodes is abnormal, in response to a number of normally operating to-be-monitored nodes in the group of to-be-monitored nodes being below a predetermined threshold comprises: outputting information that the group of to-be-monitored nodes is abnormal, and performing a preset operation, in response to a number of normally operating to-be-monitored nodes in the group of to-be-monitored nodes being below a predetermined threshold, wherein the preset operation comprises restarting abnormally operating nodes in the group of to-be-monitored nodes.

In a second aspect, the disclosure provides an apparatus for monitoring a robot operating system, the apparatus including: an obtaining unit configured to obtain process identities of to-be-monitored nodes in a group of to-be-monitored nodes; an inquiring unit configured to inquire about state information of processes corresponding to the process identities; a determining unit configured to determine whether the to-be-monitored nodes are operating normally, based on the state information of the processes; and an outputting unit configured to output information that the group of to-be-monitored nodes is abnormal, in response to a number of normally operating to-be-monitored nodes in the group of to-be-monitored nodes being below a predetermined threshold, wherein the predetermined threshold is acquired through an inquiry of preset monitoring configuration information.

In some embodiments, the monitoring configuration information further comprises names of executable files corresponding to the to-be-monitored nodes and names of function packs comprising the executable files; and the apparatus further comprises: an executable file determining unit configured to determine executable files to be executed, according to the names of the executable files, and the names of the function packs comprising the executable files; an executing unit configured to execute the executable files to be executed to start the to-be-monitored nodes; and a recording unit configured to record the process identities of the to-be-monitored nodes.

In some embodiments, the determining unit includes: an operating state determining sub-unit configured to determine whether the to-be-monitored nodes are in an operating state, based on the state information of the processes; an time point obtaining sub-unit configured to obtain time points of transmitting data by the to-be-monitored nodes, in response to determining the to-be-monitored nodes being in the operating state, based on the state information of the processes; a counting sub-unit configured to count numbers of times of transmitting data by the to-be-monitored nodes in a predetermined period, according to the time points of transmitting data by the to-be-monitored nodes; and a first determining sub-unit configured to determine that the to-be-monitored nodes are operating normally, in response to the counted numbers of times being in a preset range.

In some embodiments, the monitoring configuration information further comprises names of to-be-monitored parameters and a range of values of the to-be-monitored parameters corresponding to the names of the to-be-monitored parameters, the to-be-monitored parameters are generated by the to-be-monitored nodes in operation; and the determining unit comprises: an operating state determining sub-unit configured to determine whether the to-be-monitored nodes are in an operating state, based on the state information of the processes; an obtaining sub-unit configured to obtain the to-be-monitored parameters corresponding to the names of the to-be-monitored parameters, in response to determining the to-be-monitored nodes being in the operating state, based on the state information of the processes; and a seconding determining sub-unit configured to determine that the to-be-monitored nodes are operating normally, in response to the obtained to-be-monitored parameters being in the range of values of the to-be-monitored parameters.

In some embodiments, the outputting unit is further configured to output information that the group of to-be-monitored nodes is abnormal, and perform a preset operation, in response to a number of normally operating to-be-monitored nodes in the group of to-be-monitored nodes being below a predetermined threshold, wherein the preset operation comprises restarting abnormally operating nodes in the group of to-be-monitored nodes.

With the method and apparatus for monitoring a robot operating system according to the embodiments of this disclosure, the efficiency of maintaining the robot operating system can be improved by obtaining process identities of to-be-monitored nodes in a group of to-be-monitored nodes; inquiring about state information of processes corresponding to the process identities; determining whether the to-be-monitored nodes are operating normally, based on the state information of the processes; and outputting information that the group of to-be-monitored nodes is abnormal, in response to a number of normally operating to-be-monitored nodes in the group of to-be-monitored nodes being below a predetermined threshold.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF PREFERRED EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
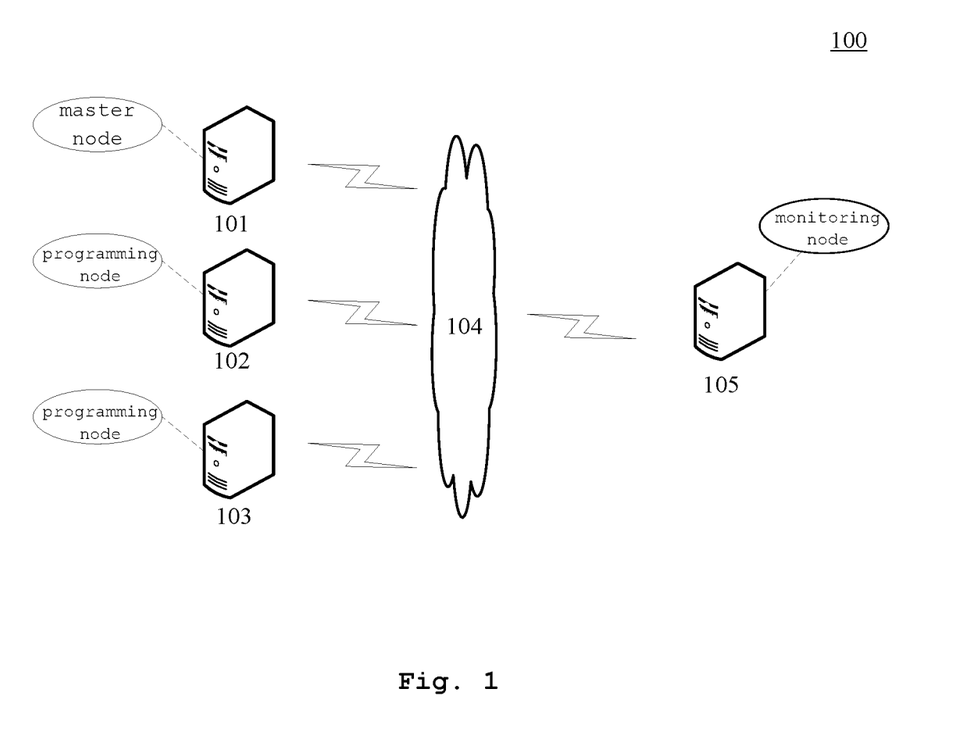
FIG. 1 is an architectural diagram of an exemplary system to which this disclosure is applicable.

FIG. 1 illustrates an exemplary system architecture 100 to which an embodiment of a method or apparatus for monitoring a robot operating system according to this disclosure can be applicable.

As illustrated in FIG. 1, the system architecture 100 can include an electronic device 101 on which a master node operates, electronic devices 102 and 103 on which programming nodes operate, a monitoring node 105, and a network 104 configured to provide a medium of a communication link between the electronic device 101 on which the master node operates, the electronic devices 102 and 103 on which the programming nodes operate, and the electronic device 105 on which the monitoring node operates. The network 104 can include various types of connections, e.g., a wired or wireless communication link, an optic fiber cable, etc. The respective nodes may operate on the same or different electronic devices, that is, the devices 101, 102, 103, and 105 may be the same device, or may be different devices. For example, in a driverless driving system, all of the master node, the programming nodes, and the monitoring node may operate in an on-vehicle controller, or the monitoring node may operate in a specialized monitoring server.

In an ROS, the main functions of the master node are to name services, and store operating parameters required for starting, connection names and connection modes of message issuing upstream nodes and message receiving downstream nodes, and connection names of existing ROS services. The programming node is a real executing module configured to process a received message, and to issue a new message to a downstream node. The monitoring node is a special node equivalent to a service node configured to accept a request and return a result. For example, in the driverless driving system, if a camera driver programming node detects an abnormality in data while processing the data and intends to be restarted, the camera driver programming node will send a restart requesting instruction to a monitoring server (i.e., the monitoring node), by invoking a monitoring Application Programming Interface (API).

The electronic device 105 on which the monitoring node operates can firstly load a monitoring configuration file to obtain information about nodes to be monitored and objects to be monitored included in the monitoring configuration file, invoke a monitoring thread to obtain data required for monitoring, and finally check whether the obtained data is in compliance with a preconfigured criterion. Particularly, the living of the nodes in a group of nodes can be monitored by firstly obtaining process identities of the nodes to be monitored in the group of nodes to be monitored; inquiring about state information of processes corresponding to the process identities; determining whether the to-be-monitored nodes are operating normally, based on the state information of the processes; and outputting information that the group of to-be-monitored nodes is abnormal, in response to a number of normally operating to-be-monitored nodes in the group of to-be-monitored nodes being below a predetermined threshold.

It shall be noted that the method for monitoring a robot operating system according to the embodiment of this disclosure is generally performed by the electronic device 105 on which the monitoring mode operates, and accordingly the apparatus for monitoring a robot operating system according to an embodiment of this disclosure is generally arranged in the electronic device 105 on which the monitoring mode operates.

It shall be appreciated that the numbers of master nodes, programming nodes, and monitoring nodes, and the number of electronic devices in FIG. 1 are merely illustrative. There may be any numbers of master nodes, programming nodes, monitoring nodes, and electronic devices as needed in practice.

Figure 2:
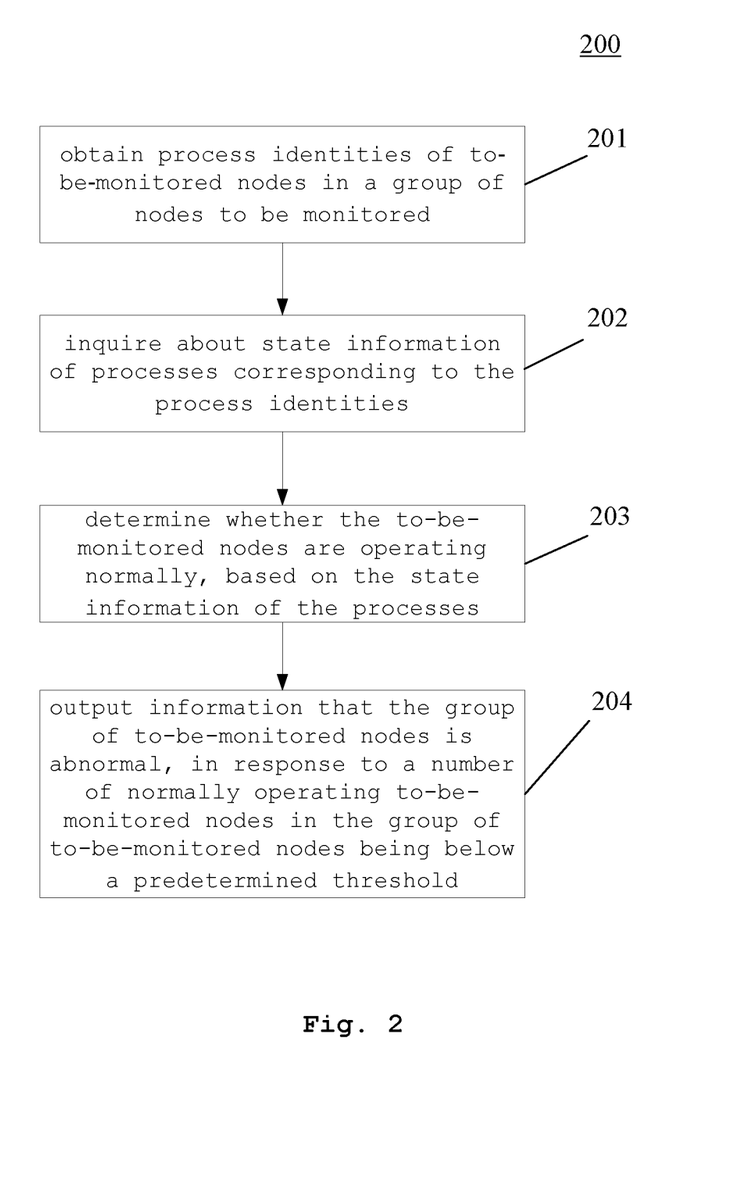
FIG. 2 is a flow chart of a method for monitoring a robot operating system according to an embodiment of this disclosure.

Further reference will be made to FIG. 2 illustrating a flowchart 200 of a method for monitoring a robot operating system according to an embodiment of this disclosure. The method for monitoring a robot operating system includes the following steps.

Step 201 is to obtain process identities of nodes to be monitored in a group of nodes to be monitored.

In this embodiment, an electronic device in FIG. 1 on which the method for monitoring a robot operating system operates (e.g., the electronic device on which the monitoring node operates as illustrated in FIG. 1) can obtain the process identities of the nodes to be monitored in the group of nodes to be monitored. Each node to be monitored may be any programming node to be monitored in the ROS, and the group of nodes to be monitored may be a set of functionally identical or similar nodes. For example, several nodes created by instantiating a camera driver can be regarded as a group of nodes. An architect of a system can write monitoring strategies of all the nodes throughout the system into a configuration file in which all the nodes are functionally grouped in the system and the monitoring strategies can be set for the group of nodes. Each process identity may be a process identifier or a process name.

In some alternative implementations of this embodiment, the configuration file can be firstly loaded, and then monitoring configuration information can be obtained from the configuration file. The monitoring configuration information can include names of executable files corresponding to the to-be-monitored nodes and names of function packs comprising the executable files. The monitoring node can be further responsible for starting the nodes throughout the system. Specifically, the executable files to be executed can be determined according to the names of the executable files, and the names of the function packs comprising the executable files, and the executable files to be executed can be executed to start the to-be-monitored nodes. The process identities of the nodes to be monitored can be recorded to be inquired later.

In some alternative implementations of this embodiment, the process identities of the nodes can be inquired directly using the names of the nodes.

Step 202 is to inquire about state information of processes corresponding to the process identities.

In this embodiment, the electronic device can inquire the state information of the processes corresponding to the process identities obtained in the step 201. There are different inquiry commands in different systems. In the Linux system, the state information of the processes corresponding to the process identities can be inquired by using a Process Status (PS) command. The state information of the processes can include the states of the processes, CPU utilization ratios of the processes, the sizes of occupied memory of the processes, and other information.

Step 203 is to determine whether the to-be-monitored nodes are operating normally, based on the state information of the processes.

In this embodiment, the electronic device can determine whether the nodes to be monitored are operating normally based on the state information of the processes inquired in the step 202. Specifically, if a process is operating, it will be determined that the process is operating normally, or it will be determined whether the process is operating normally further based on the CPU occupancy ratio, the size of an occupied memory, and other information of the process.

In some alternative implementations of this embodiment, the electronic device can further whether the to-be-monitored nodes are in an operating state, based on the state information of the processes; obtain time points of transmitting data by the to-be-monitored nodes, in response to determining the to-be-monitored nodes being in the operating state, based on the state information of the processes; count numbers of times of transmitting data by the to-be-monitored nodes in a predetermined period, according to the time points of transmitting data by the to-be-monitored nodes; and determine that the to-be-monitored nodes are operating normally, in response to the counted numbers of times being in a preset range.

In some alternative implementations of this embodiment, the monitoring configuration information further includes names of to-be-monitored parameters and a range of values of the to-be-monitored parameters corresponding to the names of the to-be-monitored parameters, and the to-be-monitored parameters are generated by the to-be-monitored nodes in operation. The electronic device can further determine whether the to-be-monitored nodes are in an operating state, based on the state information of the processes; obtain the to-be-monitored parameters corresponding to the names of the to-be-monitored parameters, in response to determining the to-be-monitored nodes being in the operating state, based on the state information of the processes; and determine that the to-be-monitored nodes are operating normally, in response to the obtained to-be-monitored parameters being in the range of values of the to-be-monitored parameters. As an example, a node to be monitored can be a programming node configured to calculate the current traveling speed of a driverless vehicle, and a parameter to be monitored can be the traveling speed. Thus, if the calculated traveling speed exceeds 120 km/h, it will be determined that the node is not operating normally. The particular range of values can be set as needed in practice.

Step 204 is to output information that the group of to-be-monitored nodes is abnormal, in response to a number of normally operating to-be-monitored nodes in the group of to-be-monitored nodes being below a predetermined threshold.

In this embodiment, the electronic device can output the information that the group of nodes to be monitored is abnormal, in response to the number of normally operating nodes to be monitored in the group of nodes to be monitored as determined in the step 203 being below the predetermined threshold. The predetermined threshold can be acquired through an inquiry of the preset monitoring configuration information. Since respective nodes in a group of nodes can backup with each other, the functions of the entire system will not be affected as long as there are more than a certain number of normally operating nodes in the group of nodes. Thus, the information that the group of nodes to be monitored is abnormal will be output, only if the number of normally operating nodes to be monitored in the group of nodes to be monitored is less than the predetermined threshold. As an example, in the driverless vehicle, there are 10 nodes in a group of camera driver nodes. If there are more than 8 nodes in normal, it will be determined that this group is normal. The group of radar driver nodes includes 16-line nodes, 32-line nodes and 64-line nodes. If there is a 64-line node living or there are a 32-line node and two 16-line nodes living, it will be determined that this group is normal.

In some alternative implementations of this embodiment, the outputting information that the group of to-be-monitored nodes is abnormal, in response to a number of normally operating to-be-monitored nodes in the group of to-be-monitored nodes being below a predetermined threshold includes: outputting information that the group of to-be-monitored nodes is abnormal, and performing a preset operation, in response to a number of normally operating to-be-monitored nodes in the group of to-be-monitored nodes being below a predetermined threshold, wherein the preset operation comprises restarting abnormally operating nodes in the group of to-be-monitored nodes. Alternatively, predetermined nodes can be started preferentially according to the monitoring strategy set by a user in the configuration file. For example, if the group of radar driver nodes is abnormal, the 64-line node will be restarted, preferentially. Moreover, the monitoring node can further provide an API for use by the user in developing a programming node, so that the API can be invoked to instruct the monitoring node to proceed accordingly if the node is abnormal. For example, if a camera driver programming node detects an abnormality in data while processing the data, and intends to be restarted, it the monitoring API can be invoked to send a restart request instruction to the monitoring server.

Figure 3:
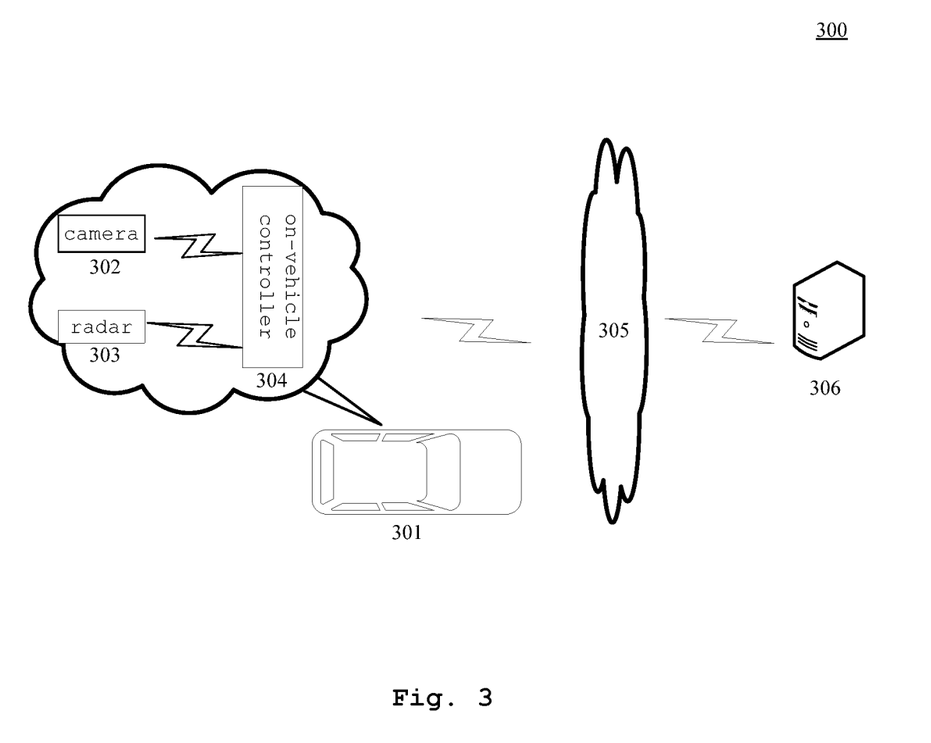
FIG. 3 is a schematic diagram of an application scenario of the method for monitoring a robot operating system according to this disclosure.

Further reference will be made to FIG. 3 which is a schematic diagram 300 of an application scenario of the method for monitoring a robot operating system according to this embodiment. In the application scenario illustrated in FIG. 3, there may be a driverless vehicle 301, a cloud server 306, and a network 305 configured to provide a medium of a communication link between the driverless vehicle 301 and the cloud server 306. The network 105 can include various types of connections, e.g., a wired or wireless communication link, an optic fiber cable, etc. The cloud server 306 may be a server providing various services, e.g., a server configured to provide the driverless vehicle 301 with a message transmission abnormality indicator. There may be a camera 302, a radar 303, and an on-vehicle controller 304 installed on the driverless vehicle 301. The camera 302 and the radar 303 can transmit acquired information to the on-vehicle controller 304 in various communication modes (e.g., over a wired or wireless communication link, an optic fiber cable, etc.) An improved robot operating system runs on the on-vehicle controller 304. By using surrounding environment information, a highly precise map, and other data acquired by the camera 302, the radar 303 and other acquiring devices, the vehicle may travel stably and precisely on the road. The numbers of cameras, radars, and backend servers in FIG. 3 are merely illustrative.

The method for monitoring a robot operating system according to the embodiment of this disclosure is generally performed by the on-vehicle controller 304, or can be performed by a specialized monitoring server. As an example in which the on-vehicle controller 304 monitors 10 nodes in a group of camera driver nodes, a monitoring configuration file can be loaded, and then a threshold 8 can be obtained for determining that the group of camera driver nodes is operating normally. That is, it will be determined that the group is normal, only if there are more than 8 nodes in normal. Thereafter, process identities of respective camera driver nodes in the group of camera driver nodes can be obtained. State information of processes corresponding to the process identities can be inquired about. It can be determined whether the camera driver nodes are operating normally based on the state information of the processes. Finally, information that the group of camera driver nodes is abnormal can be output, in response to the number of normally operating camera driver nodes in the group of camera driver nodes being less than 8.

With the method and apparatus for monitoring a robot operating system according to the embodiments of this disclosure, the efficiency of maintaining the complex robot operating system can be improved by obtaining process identities of to-be-monitored nodes in a group of to-be-monitored nodes; inquiring about state information of processes corresponding to the process identities; determining whether the to-be-monitored nodes are operating normally, based on the state information of the processes; and outputting information that the group of to-be-monitored nodes is abnormal, in response to a number of normally operating to-be-monitored nodes in the group of to-be-monitored nodes being below a predetermined threshold.

Figure 4:
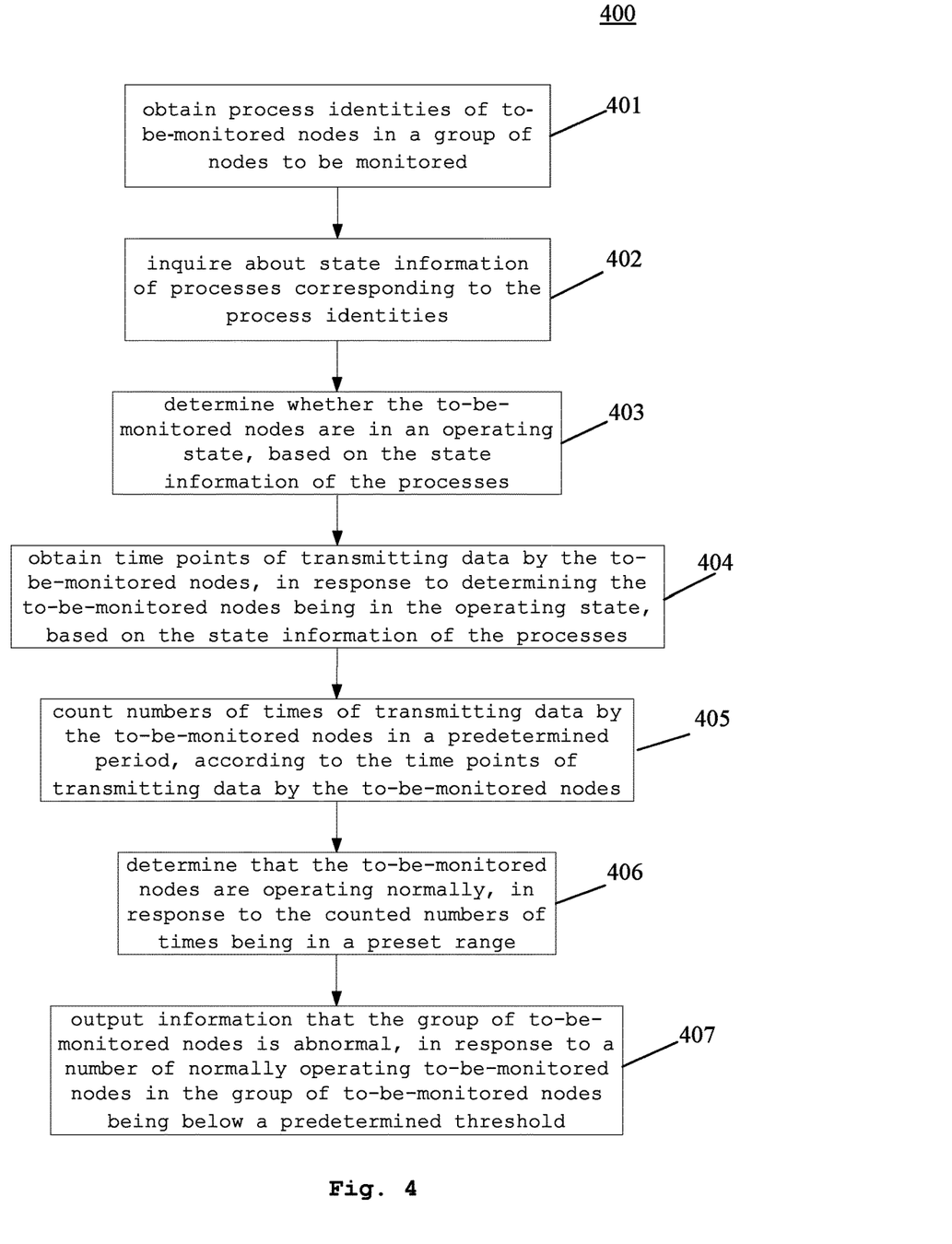
FIG. 4 is a flow chart of a method for monitoring a robot operating system according to another embodiment of this disclosure.

Further reference will be made to FIG. 4 illustrating a flowchart 400 of a method for monitoring a robot operating system according to another embodiment of this disclosure. The flow 400 of the method for monitoring a robot operating system includes the following steps.

Step 401 is to obtain process identities of nodes to be monitored in a group of nodes to be monitored.

In this embodiment, an electronic device in FIG. 1 on which the method for monitoring a robot operating system operates (e.g., the electronic device on which the monitoring node operates as illustrated in FIG. 1) can obtain the process identities of the nodes to be monitored in the group of nodes to be monitored.

Step 402 is to inquire about state information of processes corresponding to the process identities.

In this embodiment, the electronic device can inquire the state information of the processes corresponding to the process identities obtained in the step 401. There are different inquiry commands in different systems, so that the state information of the processes corresponding to the process identities can be inquired using different commands. The state information of the processes can include the states of the processes, e.g., operating, interrupted, non-interruptible, frozen, stopped, etc.

Step 403 is to determine whether the to-be-monitored nodes are in an operating state, based on the state information of the processes.

In this embodiment, the electronic device can determine whether the nodes to be monitored are in an operating state, based on the state information of the processes obtained in the step 402.

The step 404 is to obtain time points of transmitting data by the to-be-monitored nodes, in response to determining the to-be-monitored nodes being in the operating state, based on the state information of the processes.

In this embodiment, the electronic device can obtain time points of transmitting data by the to-be-monitored nodes, in response to determining the to-be-monitored nodes being in the operating state, based on the state information of the processes in the step 403. The time points of transmitting data by the nodes can be obtained by a predetermined monitoring thread. Specifically, an underlying transmission system of the ROS can be modified, so that monitoring configuration information is loaded each time a node to be monitored is started. The monitoring configuration information includes the names of topics to be monitored and the number of times of issuing or receiving messages in a predetermined period. A transmission recall mechanism is added for the topic manager configured to manage transmission of ROS data, so as to obtain time points of transmitting data by the node to be monitored. According to the transmission recall mechanism, after a native system receives or transmits data, a notification function is invoked to record the time point when the data is issued or arrives. In this implementation, the native ROS is less contaminated, and the notification function records only the current time point without making any related calculation, so that the data transmission channel will not be blocked, and the performance of transmission will not be affected, substantially.

The step 405 is to count numbers of times of transmitting data by the to-be-monitored nodes in a predetermined period, according to the time points of transmitting data by the to-be-monitored nodes.

In this embodiment, the electronic device can count numbers of times of transmitting data by the to-be-monitored nodes in a predetermined period, according to the time points of transmitting data by the to-be-monitored nodes as obtained in the step 404. The predetermined period can be a unit of time, e.g., a second and a minute, and can be set as needed in practice. The number of times of transmitting data by a to-be-monitored node in a time unit can be regarded as the transmission frequency.

The step 406 is to determine that the to-be-monitored nodes are operating normally, in response to the counted numbers of times being in a preset range.

In this embodiment, the electronic device can determine that the to-be-monitored nodes are operating normally, in response to the numbers of times counted in the step 405 being in the preset range. The preset range can be obtained by loading the monitoring configuration information, and can be set as needed in practice.

The step 407 is to output information that the group of to-be-monitored nodes is abnormal, in response to a number of normally operating to-be-monitored nodes in the group of to-be-monitored nodes being below a predetermined threshold.

In this embodiment, the electronic device can output information that the group of to-be-monitored nodes is abnormal, in response to a number of normally operating to-be-monitored nodes in the group of to-be-monitored nodes as determined in the step 406 being below the predetermined threshold. The predetermined threshold can be acquired through an inquiry of preset monitoring configuration information.

After the information that the group of nodes to be monitored is abnormal is output, it can be determined whether to restart abnormal nodes in the abnormal group of nodes, according to preset configuration information.

As can be apparent from FIG. 4 unlike the embodiment corresponding to FIG. 2, in this embodiment of FIG. 4, there are such additional steps in which the numbers of times of transmitting data by the nodes to be monitored in the predetermined period are counted and it is further determined whether the nodes are operating normally according to the numbers of times, so as to introduce an additional object to be monitored and improve the reliability of the system while improving the efficiency of maintaining the system.

Further reference will be made to FIG. 5, and as an implementation of the method illustrated in the figures above, an embodiment of this disclosure provides an apparatus for monitoring a robot operating system. The embodiment of the apparatus corresponds to the embodiment of the method as illustrated in FIG. 2, and is applicable to various electronic devices.

Figure 5:
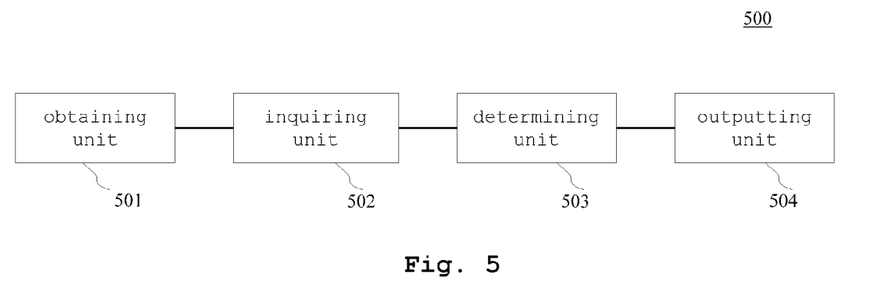
FIG. 5 is a schematic structural diagram of an apparatus for monitoring a robot operating system according to an embodiment of this disclosure.

As illustrated in FIG. 5, the apparatus 500 for monitoring a robot operating system according to this embodiment includes an obtaining unit 501, an inquiring unit 502, a determining unit 503, and an outputting unit 504, where the obtaining unit 501 is configured to obtain process identities of to-be-monitored nodes in a group of to-be-monitored nodes; the inquiring unit 502 is configured to inquire about state information of processes corresponding to the process identities; the determining unit 503 is configured to determine whether the to-be-monitored nodes are operating normally, based on the state information of the processes; and the outputting unit 504 is configured to output information that the group of to-be-monitored nodes is abnormal, in response to a number of normally operating to-be-monitored nodes in the group of to-be-monitored nodes being below a predetermined threshold, where the predetermined threshold is acquired through an inquiry of preset monitoring configuration information.

In this embodiment, reference can be made to the detailed descriptions of the step 201, the step 202, the step 203, and the step 204 in the embodiment corresponding to FIG. 2 for details of processing of the obtaining unit 501, the inquiring unit 502, the determining unit 503, and the outputting unit 504, which will not be described in detail.

In some alternative implementations of this embodiment, the monitoring configuration information further comprises names of executable files corresponding to the to-be-monitored nodes and names of function packs comprising the executable files; and the apparatus further comprises: an executable file determining unit (not shown) configured to determine executable files to be executed, according to the names of the executable files, and the names of the function packs comprising the executable files; an executing unit (not shown) configured to execute the executable files to be executed to start the to-be-monitored nodes; and a recording unit (not shown) configured to record the process identities of the to-be-monitored nodes.

In some alternative implementations of this embodiment, the determining unit 503 includes: an operating state determining sub-unit (not shown) configured to determine whether the to-be-monitored nodes are in an operating state, based on the state information of the processes; an time point obtaining sub-unit (not shown) configured to obtain time points of transmitting data by the to-be-monitored nodes, in response to determining the to-be-monitored nodes being in the operating state, based on the state information of the processes; a counting sub-unit (not shown) configured to count numbers of times of transmitting data by the to-be-monitored nodes in a predetermined period, according to the time points of transmitting data by the to-be-monitored nodes; and a first determining sub-unit (not shown) configured to determine that the to-be-monitored nodes are operating normally, in response to the counted numbers of times being in a preset range.

In some alternative implementations of this embodiment, the monitoring configuration information further includes names of to-be-monitored parameters and a range of values of the to-be-monitored parameters corresponding to the names of the to-be-monitored parameters, the to-be-monitored parameters are generated by the to-be-monitored nodes in operation; and the determining unit 503 includes: an operating state determining sub-unit (not shown) configured to determine whether the to-be-monitored nodes are in an operating state, based on the state information of the processes; an obtaining sub-unit (not shown) configured to obtain the to-be-monitored parameters corresponding to the names of the to-be-monitored parameters, in response to determining the to-be-monitored nodes being in the operating state, based on the state information of the processes; and a seconding determining sub-unit (not shown) configured to determine that the to-be-monitored nodes are operating normally, in response to the obtained to-be-monitored parameters being in the range of values of the to-be-monitored parameters.

In some alternative implementations of this embodiment, the outputting unit 504 is further configured to output information that the group of to-be-monitored nodes is abnormal, and perform a preset operation, in response to a number of normally operating to-be-monitored nodes in the group of to-be-monitored nodes being below a predetermined threshold, wherein the preset operation comprises restarting abnormally operating nodes in the group of to-be-monitored nodes.

Figure 6:
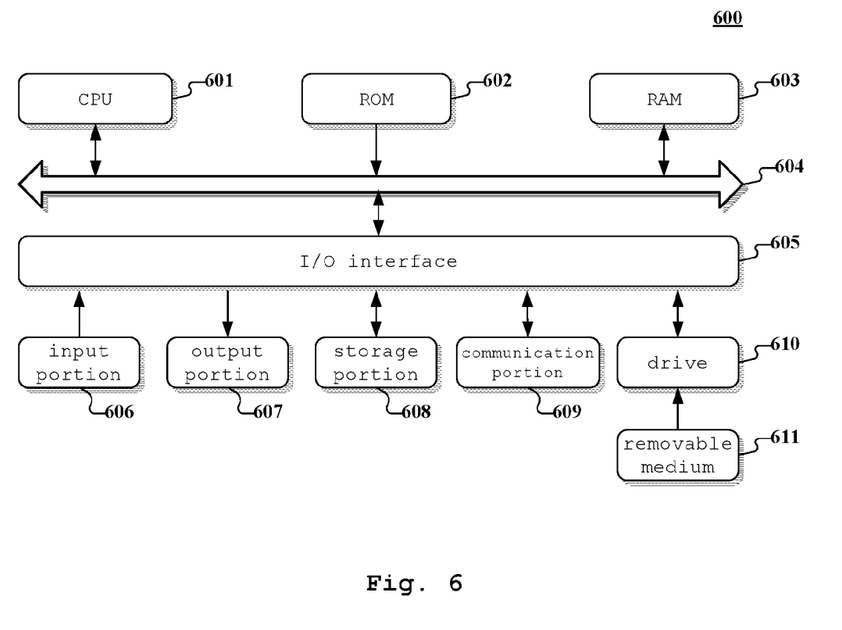
FIG. 6 a schematic structural diagram of a computer system in which a device according to an embodiment of this disclosure can be embodied.

Referring to FIG. 6, a schematic structural diagram of a computer system 600 adapted to implement an apparatus of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an obtaining unit, an inquiring unit, a determining unit and an outputting unit, where the names of these units or modules are not considered as a limitation to the units or modules. For example, the obtaining unit may also be described as "a unit for obtaining process identities of to-be-monitored nodes in a group of to-be-monitored nodes".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to: obtain process identities of to-be-monitored nodes in a group of to-be-monitored nodes; inquire about state information of processes corresponding to the process identities; determine whether the to-be-monitored nodes are operating normally, based on the state information of the processes; and output information that the group of to-be-monitored nodes is abnormal, in response to a number of normally operating to-be-monitored nodes in the group of to-be-monitored nodes being below a predetermined threshold.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for monitoring a robot operating system, the method comprising:
    obtaining process identities of to-be-monitored nodes in a group of to-be-monitored nodes;
    inquiring about state information of processes corresponding to the process identities;
    determining whether the to-be-monitored nodes are operating normally, based on the state information of the processes; and
    outputting information that the group of to-be-monitored nodes is abnormal, in response to a number of normally operating to-be-monitored nodes in the group of to-be-monitored nodes being below a predetermined threshold, wherein the predetermined threshold is acquired through an inquiry of preset monitoring configuration information,
        wherein the monitoring configuration information further comprises names of executable files corresponding to the to-be-monitored nodes and names of function packs comprising the executable files; and
    before the obtaining process identities of to-be-monitored nodes in a group of to-be-monitored nodes, the method further comprises:
        determining executable files to be executed, according to the names of the executable files, and the names of the function packs comprising the executable files;
        executing the executable files to be executed to start the to-be-monitored nodes; and
        recording the process identities of the to-be-monitored nodes.

2. The method according to claim 1, wherein the determining whether the to-be-monitored nodes are operating normally, based on the state information of the processes comprises:
    determining whether the to-be-monitored nodes are in an operating state, based on the state information of the processes;
    obtaining time points of transmitting data by the to-be-monitored nodes, in response to determining the to-be-monitored nodes being in the operating state, based on the state information of the processes;
    counting numbers of times of transmitting data by the to-be-monitored nodes in a predetermined period, according to the time points of transmitting data by the to-be-monitored nodes; and
    determining that the to-be-monitored nodes are operating normally, in response to the counted numbers of times being in a preset range.

3. The method according to claim 1, wherein the monitoring configuration information further comprises names of to-be-monitored parameters and a range of values of the to-be-monitored parameters corresponding to the names of the to-be-monitored parameters, the to-be-monitored parameters are generated by the to-be-monitored nodes in operation; and the determining whether the to-be-monitored nodes are operating normally, based on the state information of the processes comprises:
    determining whether the to-be-monitored nodes are in an operating state, based on the state information of the processes;
    obtaining the to-be-monitored parameters corresponding to the names of the to-be-monitored parameters, in response to determining the to-be-monitored nodes being in the operating state, based on the state information of the processes; and
    determining that the to-be-monitored nodes are operating normally, in response to the obtained to-be-monitored parameters being in the range of values of the to-be-monitored parameters.

4. The method according to claim 1, wherein the outputting information that the group of to-be-monitored nodes is abnormal, in response to a number of normally operating to-be-monitored nodes in the group of to-be-monitored nodes being below a predetermined threshold comprises:
    outputting information that the group of to-be-monitored nodes is abnormal, and performing a preset operation, in response to a number of normally operating to-be-monitored nodes in the group of to-be-monitored nodes being below a predetermined threshold, wherein the preset operation comprises restarting abnormally operating nodes in the group of to-be-monitored nodes.

5. An apparatus for monitoring a robot operating system, the apparatus comprising:
    an obtaining unit configured to obtain process identities of to-be-monitored nodes in a group of to-be-monitored nodes;
    an inquiring unit configured to inquire about state information of processes corresponding to the process identities;
    a determining unit configured to determine whether the to-be-monitored nodes are operating normally, based on the state information of the processes; and
    an outputting unit configured to output information that the group of to-be-monitored nodes is abnormal, in response to a number of normally operating to-be-monitored nodes in the group of to-be-monitored nodes being below a predetermined threshold, wherein the predetermined threshold is acquired through an inquiry of preset monitoring configuration information,
        wherein the monitoring configuration information further comprises names of executable files corresponding to the to-be-monitored nodes and names of function packs comprising the executable files; and
    the apparatus further comprises:
        an executable file determining unit configured to determine executable files to be executed, according to the names of the executable files, and the names of the function packs comprising the executable files;
        an executing unit configured to execute the executable files to be executed to start the to-be-monitored nodes; and a recording unit configured to record the process identities of the to-be-monitored nodes.

6. The apparatus according to claim 5, wherein the determining unit comprises:
   an operating state determining sub-unit configured to determine whether the to-be-monitored nodes are in an operating state, based on the state information of the processes;
   an time point obtaining sub-unit configured to obtain time points of transmitting data by the to-be-monitored nodes, in response to determining the to-be-monitored nodes being in the operating state, based on the state information of the processes;
   a counting sub-unit configured to count numbers of times of transmitting data by the to-be-monitored nodes in a predetermined period, according to the time points of transmitting data by the to-be-monitored nodes; and
   a first determining sub-unit configured to determine that the to-be-monitored nodes are operating normally, in response to the counted numbers of times being in a preset range.

7. The apparatus according to claim 5, wherein the monitoring configuration information further comprises names of to-be-monitored parameters and a range of values of the to-be-monitored parameters corresponding to the names of the to-be-monitored parameters, the to-be-monitored parameters are generated by the to-be-monitored nodes in operation; and
   the determining unit comprises:
      an operating state determining sub-unit configured to determine whether the to-be-monitored nodes are in an operating state, based on the state information of the processes;
      an obtaining sub-unit configured to obtain the to-be-monitored parameters corresponding to the names of the to-be-monitored parameters, in response to determining the to-be-monitored nodes being in the operating state, based on the state information of the processes; and
      a seconding determining sub-unit configured to determine that the to-be-monitored nodes are operating normally, in response to the obtained to-be-monitored parameters being in the range of values of the to-be-monitored parameters.

8. The apparatus according to claim 5, wherein the outputting unit is further configured to:
   output information that the group of to-be-monitored nodes is abnormal, and perform a preset operation, in response to a number of normally operating to-be-monitored nodes in the group of to-be-monitored nodes being below a predetermined threshold, wherein the preset operation comprises restarting abnormally operating nodes in the group of to-be-monitored nodes.

9. A non-transitory computer storage medium storing a computer program, which when executed by a processor, cause the processor to perform operations, the operations comprising:
   obtaining process identities of to-be-monitored nodes in a group of to-be-monitored nodes;
   inquiring about state information of processes corresponding to the process identities;
   determining whether the to-be-monitored nodes are operating normally, based on the state information of the processes; and
   outputting information that the group of to-be-monitored nodes is abnormal, in response to a number of normally operating to-be-monitored nodes in the group of to-be-monitored nodes being below a predetermined threshold, wherein the predetermined threshold is acquired through an inquiry of preset monitoring configuration information,
   wherein the monitoring configuration information further comprises names of executable files corresponding to the to-be-monitored nodes and names of function packs comprising the executable files; and
   before the obtaining process identities of to-be-monitored nodes in a group of to-be-monitored nodes, the operations further comprise:
      determining executable files to be executed, according to the names of the executable files, and the names of the function packs comprising the executable files;
      executing the executable files to be executed to start the to-be-monitored nodes; and
      recording the process identities of the to-be-monitored nodes.

10. The non-transitory computer storage medium according to claim 9, wherein the determining whether the to-be-monitored nodes are operating normally, based on the state information of the processes comprises:
    determining whether the to-be-monitored nodes are in an operating state, based on the state information of the processes;
    obtaining time points of transmitting data by the to-be-monitored nodes, in response to determining the to-be-monitored nodes being in the operating state, based on the state information of the processes;
    counting numbers of times of transmitting data by the to-be-monitored nodes in a predetermined period, according to the time points of transmitting data by the to-be-monitored nodes; and
    determining that the to-be-monitored nodes are operating normally, in response to the counted numbers of times being in a preset range.

11. The non-transitory computer storage medium according to claim 9, wherein the monitoring configuration information further comprises names of to-be-monitored parameters and a range of values of the to-be-monitored parameters corresponding to the names of the to-be-monitored parameters, the to-be-monitored parameters are generated by the to-be-monitored nodes in operation; and the determining whether the to-be-monitored nodes are operating normally, based on the state information of the processes comprises:
    determining whether the to-be-monitored nodes are in an operating state, based on the state information of the processes;
    obtaining the to-be-monitored parameters corresponding to the names of the to-be-monitored parameters, in response to determining the to-be-monitored nodes being in the operating state, based on the state information of the processes; and
    determining that the to-be-monitored nodes are operating normally, in response to the obtained to-be-monitored parameters being in the range of values of the to-be-monitored parameters.

12. The non-transitory computer storage medium according to claim 9, wherein the outputting information that the group of to-be-monitored nodes is abnormal, in response to a number of normally operating to-be-monitored nodes in the group of to-be-monitored nodes being below a predetermined threshold comprises:
    outputting information that the group of to-be-monitored nodes is abnormal, and performing a preset operation, in response to a number of normally operating to-bemonitored nodes in the group of to-be-monitored nodes being below a predetermined threshold, wherein the preset operation comprises restarting abnormally operating nodes in the group of to-be-monitored nodes.

* * * * *